US012496044B1

(12) United States Patent
 Mirar et al.

(10) Patent No.: US 12,496,044 B1
(45) Date of Patent: Dec. 16, 2025

(54) SYSTEM AND METHOD FOR REAL-TIME CORRECTION OF STRAIN TRACES IN PATIENTS WITH CONDUCTION DELAYS

(71) Applicant: GE Precision Healthcare LLC, Waukesha, WI (US)

(72) Inventors: Hani Nozari Mirar, Oslo (NO); Stian Langeland, Vollen (NO); Sten Roar Snare, Bekkestua (NO)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/883,697

(22) Filed: Sep. 12, 2024

(51) Int. Cl.
 *A61B 8/00* (2006.01)
 *A61B 8/08* (2006.01)

(52) U.S. Cl.
 CPC ............ *A61B 8/486* (2013.01); *A61B 8/0883* (2013.01); *A61B 8/461* (2013.01); *A61B 8/485* (2013.01); *A61B 8/5223* (2013.01); *A61B 8/5284* (2013.01); *A61B 2576/023* (2013.01)

(58) Field of Classification Search
 CPC ....... A61B 8/486; A61B 8/0883; A61B 8/461; A61B 8/485; A61B 8/5223; A61B 8/5284; A61B 2576/023
 See application file for complete search history.

(56) References Cited

U.S. PATENT DOCUMENTS

| | | | | |
|---|---|---|---|---|
| 6,674,879 B1 * | 1/2004 | Weisman | ............ | G01S 7/52088 382/128 |
| 7,606,402 B2 | 10/2009 | Heimdal et al. | | |
| 2005/0015009 A1 * | 1/2005 | Mourad | ............... | A61B 5/0051 600/453 |
| 2011/0262018 A1 * | 10/2011 | Kumar | ................. | G06T 7/0012 382/131 |
| 2012/0022843 A1 * | 1/2012 | Ionasec | ................... | G06T 13/20 703/11 |
| 2013/0211256 A1 | 8/2013 | Russell et al. | | |
| 2016/0035087 A1 * | 2/2016 | Jackson | ............... | A61B 8/0883 382/131 |
| 2017/0150928 A1 * | 6/2017 | del Alamo de Pedro | .................... | A61B 5/02028 |
| 2022/0192627 A1 * | 6/2022 | Quattrone-Brown | .... | A61B 8/14 |

OTHER PUBLICATIONS

M Esmaeilzadeh at. al., Evaluation of Regional Myocardial Systolic Function in the Early Stage of Acute Myocardial Infarction by Strain Rate Imaging, Dec. 2009.

* cited by examiner

*Primary Examiner* — Bo Joseph Peng
(74) *Attorney, Agent, or Firm* — SPQ IP LLC

(57) ABSTRACT

Various systems and methods are provided for determining information related to cardiac deformation of a region of interest of a heart of a subject using deformation imaging based on a delineation of the cardiac cycle of the heart of the subject determined from imaging data. The imaging data of the region of interest of the heart of the subject may be received. A set of mechanical events of the heart of the subject may be detected based on analyzing the imaging data. The delineation of the cardiac cycle may be determined based on the set of mechanical events of the heart of the subject. The information related to cardiac deformation of the region of interest of the heart of the subject may be determined using deformation imaging based on the delineation of the cardiac cycle. The information related to cardiac deformation of the region of interest may be displayed.

20 Claims, 10 Drawing Sheets

SYSTEM AND METHOD FOR REAL-TIME CORRECTION OF STRAIN TRACES IN PATIENTS WITH CONDUCTION DELAYS

TECHNICAL FIELD

The present disclosure relates to systems and methods for determining information related to cardiac deformation of a region of interest of the heart of the subject using deformation imaging. More specifically, the present disclosure relates to systems and methods for determining information related to cardiac deformation of the region of interest of the heart of the subject using deformation imaging and a delineation of a cardiac cycle of the heart that is determined using imaging data of the region of interest of the heart.

BACKGROUND

The cardiac cycle may refer to a sequence of events of the heart that result in the movement of blood through the heart and through the body as a whole. A single performance of the cardiac cycle may result in a single heartbeat. Generally, the cardiac cycle may include diastole and systole. Diastole may begin with the closing of the aortic valve and the closing of the pulmonary valve, and end with the closing of the mitral valve and the closing of the tricuspid valve. Systole may begin with the closing of the mitral valve and the closing of the tricuspid valve, and end with the closing of the aortic valve and the closing of the pulmonary valve. The myocardium contracts and relaxes during the cardiac cycle to facilitate blood circulation through the heart's chambers and valves. In diastole, the heart relaxes which allows blood to fill the atria and flow into the ventricles via the atrioventricular valves. During systole, the ventricles contract, the atrioventricular valves close to prevent backflow, and the semilunar valves open to eject blood into the aorta and pulmonary artery. After contraction, the heart relaxes again which allows the cardiac cycle to repeat.

Deformation imaging may refer to an imaging technique to evaluate myocardial deformation. Deformation, or "strain," may refer to the change in cardiac length of the myocardium from end-diastole to end-systole. Deformation imaging may be used for assessment of myocardial mechanics. For example, deformation imaging may be used to detect cardiomyopathies, heart disease, myocardial dysfunction, or the like.

For deformation imaging, a region of interest of the heart may be segmented into a set of myocardial segments. The myocardial segments may be tracked during the cardiac cycle using a deformation imaging technique (e.g., a template matching technique, an image registration technique, an artificial intelligence (AI) technique, or the like). Strain values for the set of myocardial segments may be determined based on the tracking of the myocardial segments. For example, a strain curve, or "strain trace," that includes strain values for a myocardial segment over the cardiac cycle may be determined. Various relevant strain values (e.g., end-systolic strain, peak systolic strain, peak strain, etc.) may be determined from the strain curve.

For deformation imaging, the cardiac cycle may be delineated using one or more reference points in time. Generally, end-diastole is selected as a reference point in time. End-diastole may be characterized by the closure of the mitral valve. Various events may be used as a surrogate of the closure of the mitral valve. For example, the events may include the beginning of the QRS complex as measured by electrocardiogram (ECG) data, the presence of the R-peak in the ECG data, a peak of a strain curve, or the like. Another reference point, such as end-systole, may be used to establish a reference position of a myocardial segment and/or a reference length of the myocardial segment for deformation imaging.

In some cases, the actual timing of the mitral valve closure and the timing of the surrogate events in the ECG data may disassociate. For example, the surrogate events may disassociate from the actual closure of the mitral valve in subjects that are experiencing conduction delays or ECG abnormalities. Particularly, the QRS complex may be elongated in subjects that are experiencing left bundle branch block or right bundle branch block. In this case, a time point of the beginning of the QRS complex might not correspond to a time point of the closure of the mitral valve.

In these cases, the delineated cardiac cycle might not accurately correspond to the actual cardiac cycle of the subject. Accordingly, a deformation imaging system may determine strain values for the myocardial segments during a delineated cardiac cycle that does not correspond to the actual cardiac cycle of the underlying subject. Further, the deformation imaging system may determine various deformation imaging measurements at time-specific events that might not correspond to the actual underlying cardiac events, and therefore may be inaccurate. In this way, the overall assessment of cardiac function may be inaccurate because the deformation imaging measurements for a delineated cardiac cycle do not correspond to the actual underlying cardiac cycle of the subject.

SUMMARY

This summary introduces concepts that are described in more detail in the detailed description. It should not be used to identify essential features of the claimed subject matter, nor to limit the scope of the claimed subject matter.

In an aspect, a system may include a memory configured to store instructions; and one or more processors configured to execute the instructions to: receive imaging data of a region of interest of a heart of a subject; analyze the imaging data of the region of interest of the heart of the subject to detect a set of mechanical events of the heart of the subject; determine a delineation of a cardiac cycle of the heart of the subject based on the detected set of mechanical events; determine information related to cardiac deformation of the region of interest of the heart of the subject using deformation imaging based on the delineation of the cardiac cycle of the heart of the subject; and display the information related to cardiac deformation of the region of interest of the heart of the subject.

In another aspect, a method may include receiving imaging data of a region of interest of a heart of a subject; analyzing the imaging data of the region of interest of the heart of the subject to detect a set of mechanical events of the heart of the subject; determining a delineation of a cardiac cycle of the heart of the subject based on the detected set of mechanical events; determining information related to cardiac deformation of the region of interest of the heart of the subject using deformation imaging based on the delineation of the cardiac cycle of the heart of the subject; and displaying the information related to cardiac deformation of the region of interest of the heart of the subject.

In yet another aspect, a non-transitory computer-readable medium may store instructions that, when executed by one or more processors, cause the one or more processors to: receive imaging data of a region of interest of a heart of a subject; analyze the imaging data of the region of interest of the heart of the subject to detect a set of mechanical events of the heart of the subject; determine a delineation of a cardiac cycle of the heart of the subject based on the detected set of mechanical events; determine information related to cardiac deformation of the region of interest of the heart of the subject using deformation imaging based on the delineation of the cardiac cycle of the heart of the subject; and display the information related to cardiac deformation of the region of interest of the heart of the subject.

DETAILED DESCRIPTION

As addressed above, some deformation imaging systems may use events from ECG data to delineate the cardiac cycle for deformation imaging measurements. Further, as addressed above, the events of the ECG data that are used as surrogates for actual mechanical events of the heart may disassociate from the actual underlying mechanical events. In these cases, the delineated cardiac cycle might not accurately correspond to the actual cardiac cycle of the subject. As such, the various deformation imaging measurements at time-specific events might not correspond to the actual underlying cardiac events, and therefore may be inaccurate. In this way, the overall assessment of cardiac function may be inaccurate.

Some embodiments herein provide a technique for detecting a set of mechanical events of the heart using imaging data, and using the detected set of mechanical events to delineate the cardiac cycle. Accordingly, some embodiments herein may improve the accuracy of the correspondence between the delineated cardiac cycle that is used for deformation imaging and the actual cardiac cycle of the subject. In this way, some embodiments herein may improve the accuracy of deformation imaging measurements, and improve the accuracy of assessment of cardiac function using deformation imaging. Accordingly, some embodiments herein provide a technical improvement in the technical field of deformation imaging, and provide a technical improvement to systems and methods for deformation imaging. Further, some embodiments herein reduce, or eliminate, the need of a user to correct a delineated cycle, thereby conserving processor and memory resources of systems for deformation imaging.

Figure 1:
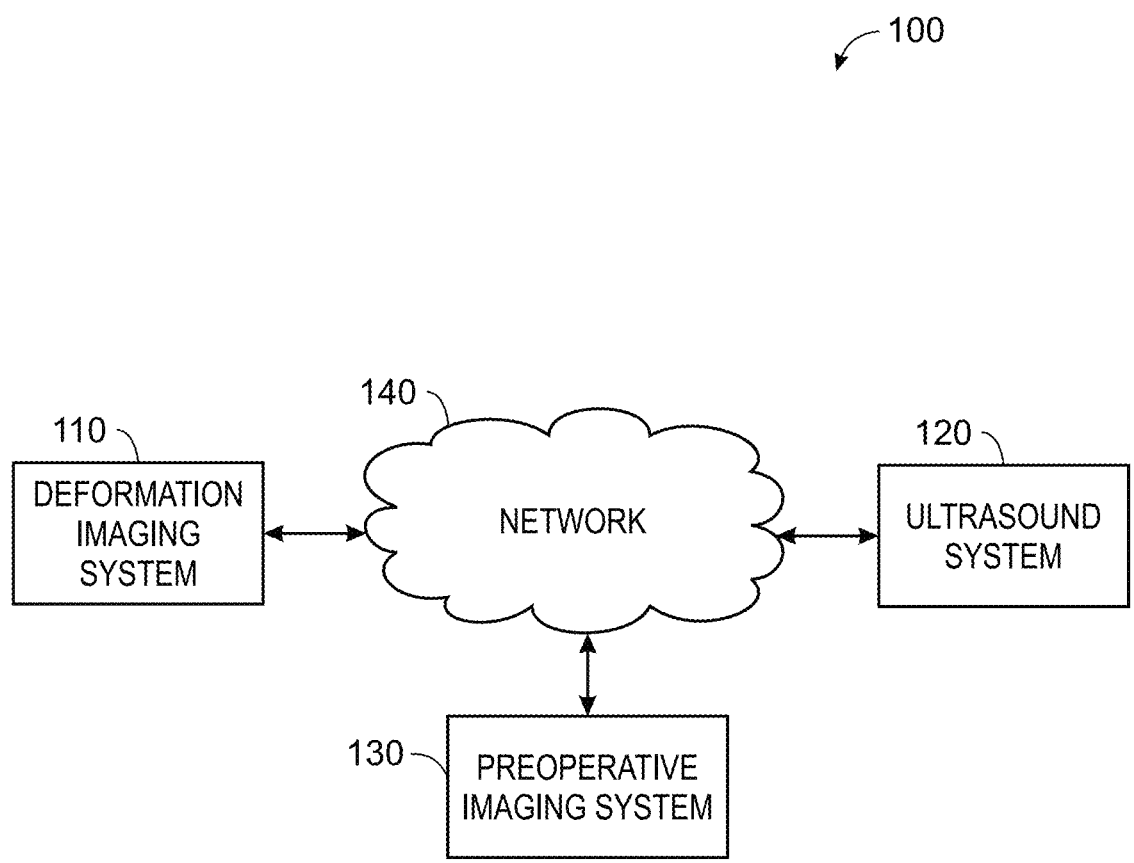
FIG. 1 is a diagram of an example system 100 for determining information related to cardiac deformation of a region of interest of a heart of a subject using deformation imaging and a delineation of a cardiac cycle of the heart that is determined using imaging data of the region of interest of the heart.

FIG. 1 is a diagram of an example system for determining information related to cardiac deformation of a region of interest of a heart of a subject using deformation imaging and a delineation of a cardiac cycle of the heart that is determined using imaging data of the region of interest of the heart. As shown in FIG. 1, the system 100 may include a deformation imaging system 110, an ultrasound system 120, a preoperative imaging system 130, and a network 140.

The deformation imaging system 110 may be configured to receive imaging data of a region of interest of a heart of a subject; analyze the imaging data of the region of interest of the heart of the subject to detect a set of mechanical events of the heart of the subject; determine a delineation of a cardiac cycle of the heart of the subject based on the detected set of mechanical events; determine information related to cardiac deformation of the region of interest of the heart of the subject using deformation imaging based on the delineation of the cardiac cycle of the heart of the subject; and display the information related to cardiac deformation of the region of interest of the heart of the subject. For example, the deformation imaging system 110 may be a computer, a server, a medical device, or the like.

The ultrasound system 120 may be configured to receive ultrasound data of a region of interest of a heart of a subject. For example, the ultrasound system 120 may be a two-dimensional (2D) ultrasound system, a three-dimensional (3D) ultrasound system, a four-dimensional (4D) ultrasound system, a Doppler ultrasound system, or the like. The subject may be a person, an animal, a phantom, or the like.

The preoperative imaging system 130 may be configured to receive preoperative imaging data of the region of interest of the heart of the subject. For example, the preoperative imaging system 130 may be a computed tomography (CT) system, a magnetic resonance imaging (MRI) system, an ultrasound system, an X-ray system, a positron emission tomography (PET) device, or the like.

The network 140 may permit communication between the deformation imaging system 110, the ultrasound system 120, and the preoperative imaging system 130. For example, the network 140 may be a local area network (LAN), a wide area network (WAN), a metropolitan area network (MAN), a cellular network, a private network, an ad hoc network, an intranet, the Internet, a fiber optic-based network, a wired network, a wireless network, or the like, and/or a combination of these or other types of networks.

The number and arrangement of the system 100 are provided as an example. In practice, the system 100 may include additional systems, fewer systems, different systems, or differently arranged systems than those shown in FIG. 1. Additionally, or alternatively, a set of systems (e.g., one or more systems) of the system 100 may be integrated into a single system, and/or perform one or more functions described as being performed by another system, or set of systems, of the system 100.

Figure 2:
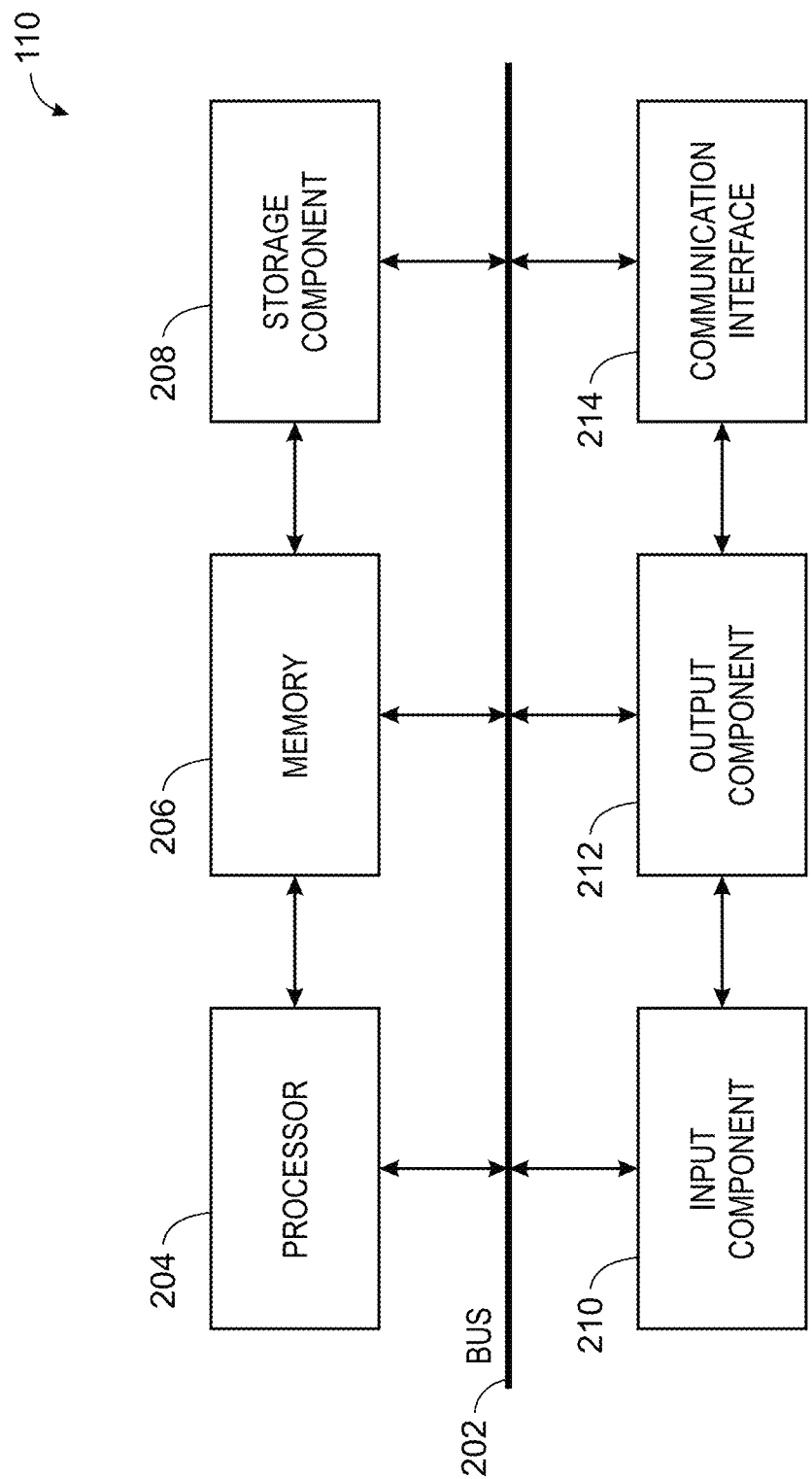
FIG. 2 is a diagram of an example deformation imaging system for determining information related to cardiac deformation of a region of interest of a heart of a subject using deformation imaging and a delineation of a cardiac cycle of the heart that is determined using imaging data of the region of interest of the heart.

FIG. 2 is a diagram of an example deformation imaging system 110 for determining information related to cardiac deformation of a region of interest of a heart of a subject using deformation imaging and a delineation of a cardiac cycle of the heart that is determined using imaging data of the region of interest of the heart. As shown in FIG. 2, the deformation imaging system 110 may include a bus 202, a processor 204, a memory 206, a storage component 208, an input component 210, an output component 212, and a communication interface 214.

The bus 202 includes a component that permits communication among the components of the deformation imaging system 110. The processor 204 may be implemented in hardware, firmware, or a combination of hardware and software. The processor 204 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 204 may include one or more processors capable of being programmed to perform a function. The processor 204 may include one or more processors 204 configured to perform the operations described herein. For example, a single processor 204 may be configured to perform all of the operations described herein. Alternatively, multiple processors 204, collectively, may be configured to perform all of the operations described herein, and each of the multiple processors 204 may be configured to perform a subset of the operations descried herein. For example, a first processor 204 may perform a first subset of the operations described herein, a second processor 204 may be configured to perform a second subset of the operations described herein, etc.

The memory 206 may include a random access memory (RAM), a read only memory (ROM), and/or another type of dynamic or static storage device (e.g., a flash memory, a magnetic memory, and/or an optical memory) that stores information and/or instructions for use by the processor 204.

The storage component 208 may store information and/or software related to the operation and use of the deformation imaging system 110. For example, the storage component 208 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 210 may include a component that permits the deformation imaging system 110 to receive information, such as via user input (e.g., a touch screen display, a keyboard, a keypad, a mouse, a button, a switch, a camera, and/or a microphone). Additionally, or alternatively, the input component 210 may include a sensor for sensing information (e.g., a global positioning system (GPS) component, an accelerometer, a gyroscope, and/or an actuator). The output component 212 may include a component that provides output information from the deformation imaging system 110 (e.g., a display, a speaker for outputting sound at the output sound level, and/or one or more light-emitting diodes (LEDs)).

The communication interface 214 may include a transceiver-like component (e.g., a transceiver and/or a separate receiver and transmitter) that enables the deformation imaging system 110 to communicate with other systems, such as via a wired connection, a wireless connection, or a combination of wired and wireless connections. The communication interface 214 may permit the deformation imaging system 110 to receive information from another system and/or provide information to another system. For example, the communication interface 214 may include an Ethernet interface, an optical interface, a coaxial interface, an infrared interface, a radio frequency (RF) interface, a universal serial bus (USB) interface, a Wi-Fi interface, a cellular network interface, or the like.

The deformation imaging system 110 may perform one or more processes described herein. The deformation imaging system 110 may perform these processes based on the processor 204 executing software instructions stored by a non-transitory computer-readable medium, such as the memory 206 and/or the storage component 208. A computer-readable medium may be defined herein as a non-transitory memory device. A memory device may include memory space within a single physical storage device or memory space spread across multiple physical storage devices.

The software instructions may be read into the memory 206 and/or the storage component 208 from another computer-readable medium or from another system via the communication interface 214. When executed, the software instructions stored in the memory 206 and/or the storage component 208 may cause the processor 204 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the deformation imaging system 110 may include additional components, fewer components, different components, or differently arranged components than those shown in FIG. 2. Additionally, or alternatively, a set of components (e.g., one or more components) of the deformation imaging system 110 may perform one or more functions described as being performed by another set of components of the deformation imaging system 110.

Figure 3:
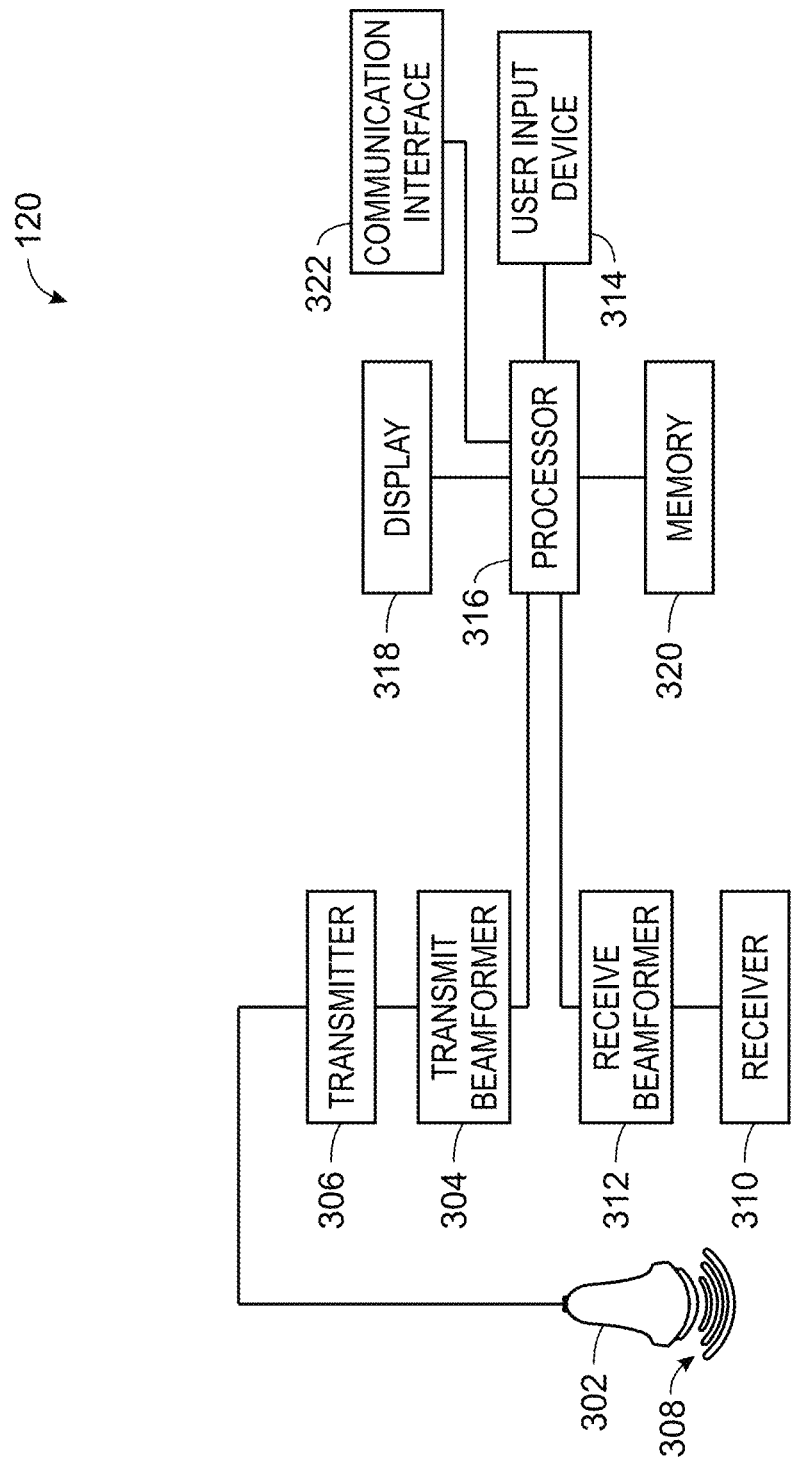
FIG. 3 is a diagram of an example ultrasound system for receiving ultrasound data of the region of interest of the heart of the subject.

FIG. 3 is a diagram of an example ultrasound system 120 for receiving ultrasound data of the region of interest of the heart of the subject. As shown in FIG. 3, the ultrasound system 120 may include an ultrasound probe 302, a transmit beamformer 304, a transmitter 306, elements 308 a receiver 310, a receive beamformer 312, a user input device 314, a processor 316, a display 318, a memory 320, and a communication interface 322. The foregoing components may be connected via wired or wireless connections.

The ultrasound probe 302 may be configured to receive ultrasound data. For example, the ultrasound probe 302 may be a linear probe, a phase array probe, a curved linear probe coupled with a position tracking system, a mechanically steered linear array transducer, a phased array transducer, a curved linear array transducer, an electronically steered 2D transducer array, an electronic 3D (e3D) probe, an electronic 4d (e4D) probe, a low profile wearable patch version of any of the foregoing probes, or the like. According to an embodiment, the ultrasound probe 302 may be configured to generate ultrasound signals, emit the ultrasound signals towards the region of interest of a subject, receive echo ultrasound signals that are back-scattered from the region of interest of the subject, generate ultrasound data based on the echo ultrasound signals, and output the ultrasound data.

The transmit beamformer 304 may be configured to apply delay times to electrical signals provided to the elements 308 to focus corresponding ultrasound signals at the region of interest. The transmitter 306 may be configured to transmit electrical signals to the elements 308 to drive the elements 308 to emit ultrasound signals towards the region of interest. The elements 308 may be configured to receive the electrical signals from the transmitter 306, convert the electrical signals into ultrasound signals, and emit the ultrasound signals towards the region of interest. The elements 308 may be configured to receive echo ultrasound signals that are back-scattered by the region of interest, convert the echo ultrasound signals into electrical signals, and provide the electrical signals to the receiver 310. The receiver 310 may be configured to receive electrical signals from the elements 308, and provide the electrical signals to the receive beamformer 312. The receive beamformer 312 may apply delay times to the electrical signals received from the elements 308.

The user input device 314 may be configured to receive a user input, and provide the user input to the processor 316. For example, the user input device 314 may be a touch screen display, a keyboard, a keypad, a mouse, a button, a switch, a microphone, or the like. Additionally, or alternatively, the user input device 314 may be configured to sense information. For example, the user input device 314 may sense information from an electro-magnetic positioning system, an inertial measurement system, an accelerometer, a gyroscope, an actuator, or the like.

The processor 316 may be configured to perform the operations as described herein. For example, the processor 216 may be a CPU, a GPU, an APU, a microprocessor, a microcontroller, a DSP, an FPGA, an ASIC, or another type of processing component. The processor 316 may be implemented in hardware, firmware, or a combination of hardware and software. The processor 316 may include one or more processors 316 configured to perform the operations described herein. For example, a single processor 316 may be configured to perform all of the operations described herein. Alternatively, multiple processors 316, collectively, may be configured to perform all of the operations described herein, and each of the multiple processors 316 may be configured to perform a subset of the operations descried herein. For example, a first processor 316 may perform a first subset of the operations described herein, a second processor 316 may be configured to perform a second subset of the operations described herein, etc.

The processor 316 may be configured to control the ultrasound probe 302 to receive ultrasound data. The processor 316 may be configured to control which of the elements 308 are active, and control the shape of a beam emitted from the ultrasound probe 302. The processor 316 may generate ultrasound images for display. For example, the processor 216 may generate B-mode images, color Doppler images, anatomical M-mode images, color M-mode images, or the like. The ultrasound images may be 3D images, 2D images, single plane images, bi-plane images, three-plane images, multi-plane images, or the like. The ultrasound images may correspond to various anatomical planes (e.g., sagittal, coronal, and transverse) of the region of interest.

The display 318 may be configured to display information. For example, the display 318 may be a monitor, an LED display, a cathode ray tube, a projector display, a touchscreen, tablet computer, mobile phone, or the like. The display 318 may display ultrasound images based on the ultrasound data in real-time. For example, the display 318 may display the ultrasound images within one second, two seconds, five seconds, etc., of the ultrasound data being received by the ultrasound probe 302.

The memory 320 may be configured to store information and/or instructions for use by the processor 316. The memory 320 may be a non-transitory computer-readable medium. For example, the memory 320 may be a random access memory (RAM), a read only memory (ROM), and/or another type of dynamic or static storage device (e.g., a flash memory, a magnetic memory, and/or an optical memory) that stores information and/or instructions for use by the processor 316. The memory 320 may be configured to store instructions that, when executed by the processor 316, cause the processor 316 to perform the operations described herein.

The communication interface 322 may be configured to enable the processor 316 to communicate with other systems, such as via a wired connection, a wireless connection, or a combination of wired and wireless connections. For example, the communication interface 322 may include an Ethernet interface, an optical interface, a coaxial interface, an infrared interface, an RF interface, a USB interface, a Wi-Fi interface, a cellular network interface, or the like.

The number and arrangement of the components of the ultrasound system 120 shown in FIG. 3 are provided as an example. In practice, the ultrasound system 120 may include additional components, fewer components, different components, or differently arranged components than those shown in FIG. 3. Additionally, or alternatively, a set of components (e.g., one or more components) of the ultrasound system 120 may perform one or more functions described as being performed by another set of components of the ultrasound system 120.

Figure 4:
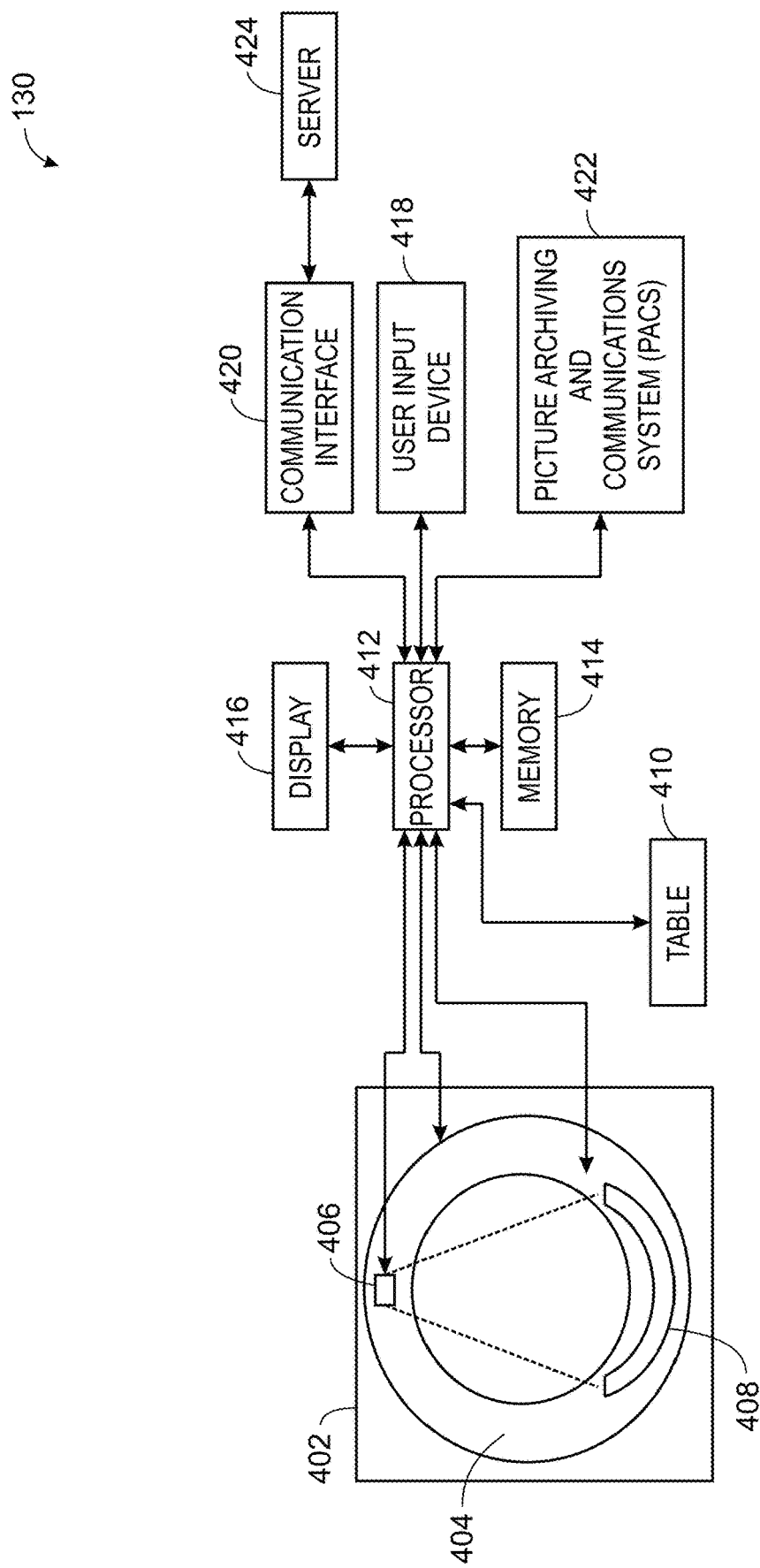
FIG. 4 is a diagram of an example preoperative imaging system for receiving preoperative imaging data of the region of interest of the heart of the subject.

FIG. 4 is a diagram of an example preoperative imaging system 130 for receiving preoperative imaging data of the region of interest of the heart of the subject. As shown in FIG. 4, the preoperative imaging system 130 may include a gantry 402, a rotational frame 404, an X-ray source 406, an X-ray detector 408, a table 410, a processor 412, a memory 414, a display 416, a user input device 418, a communication interface 420, a picture archiving and communications system (PACS) 422, and a server 424.

The processor 412 may be configured to control operations of the preoperative imaging system 130. For example, the processor 412 may be a CPU, a GPU, an APU, a microprocessor, a microcontroller, a DSP, an FPGA, an ASIC, or the like. The processor 412 may be implemented in hardware, firmware, or a combination of hardware and software. The processor 412 may include one or more processors 412 configured to perform the operations described herein. For example, a single processor 412 may be configured to perform all of the operations described herein. Alternatively, multiple processors 412, collectively, may be configured to perform all of the operations described herein, and each of the multiple processors 412 may be configured to perform a subset of the operations descried herein. For example, a first processor 412 may perform a first subset of the operations described herein, a second processor 412 may be configured to perform a second subset of the operations described herein, etc.

The processor 412 may be configured to control the gantry 402, movement of the rotational frame 404, the X-ray source 406, the X-ray detector 408, and movement of the table 410.

The memory 414 may be configured to store information and/or instructions for use by the processor 412. The memory 414 may be a non-transitory computer-readable medium. For example, the memory 414 may be a RAM, a ROM, a flash memory, a magnetic memory, an optical memory, or the like. The memory 414 may be configured to store instructions that, when executed by the processor 412, cause the processor 412 to perform the operations described herein.

The display 416 may be configured to display information. For example, the display 416 may be a monitor, an LED display, a cathode ray tube, a projector display, a touchscreen, tablet computer, mobile phone, or the like.

The user input device 418 may be configured to receive a user input, and provide the user input to the processor 412. For example, the user input device 418 may be a touch screen display, a keyboard, a keypad, a mouse, a button, a switch, a microphone, or the like. Additionally, or alternatively, the user input device 418 may be configured to sense information. For example, the user input device 418 may sense information from an electro-magnetic positioning system, an inertial measurement system, an accelerometer, a gyroscope, an actuator, or the like.

The communication interface 420 may be configured to enable the processor 412 to communicate with other devices, such as via a wired connection, a wireless connection, or a combination of wired and wireless connections. For example, the communication interface 420 may include an Ethernet interface, an optical interface, a coaxial interface, an infrared interface, an RF interface, a USB interface, a Wi-Fi interface, a cellular network interface, or the like. The PACS 422 may be configured to communicate with external systems and/or networks to permit users at various locations to access the medical image. The server 424 may be configured to store one or more models as described herein. For example, the server 424 may be an on-premises server, a cloud server, a virtual machine, or the like.

The number and arrangement of the components of the preoperative imaging system 130 shown in FIG. 4 are provided as an example. In practice, the preoperative imaging system 130 may include additional components, fewer components, different components, or differently arranged components than those shown in FIG. 4. Additionally, or alternatively, a set of components (e.g., one or more components) of the preoperative imaging system 130 may perform one or more functions described as being performed by another set of components of the preoperative imaging system 130.

Figure 5:
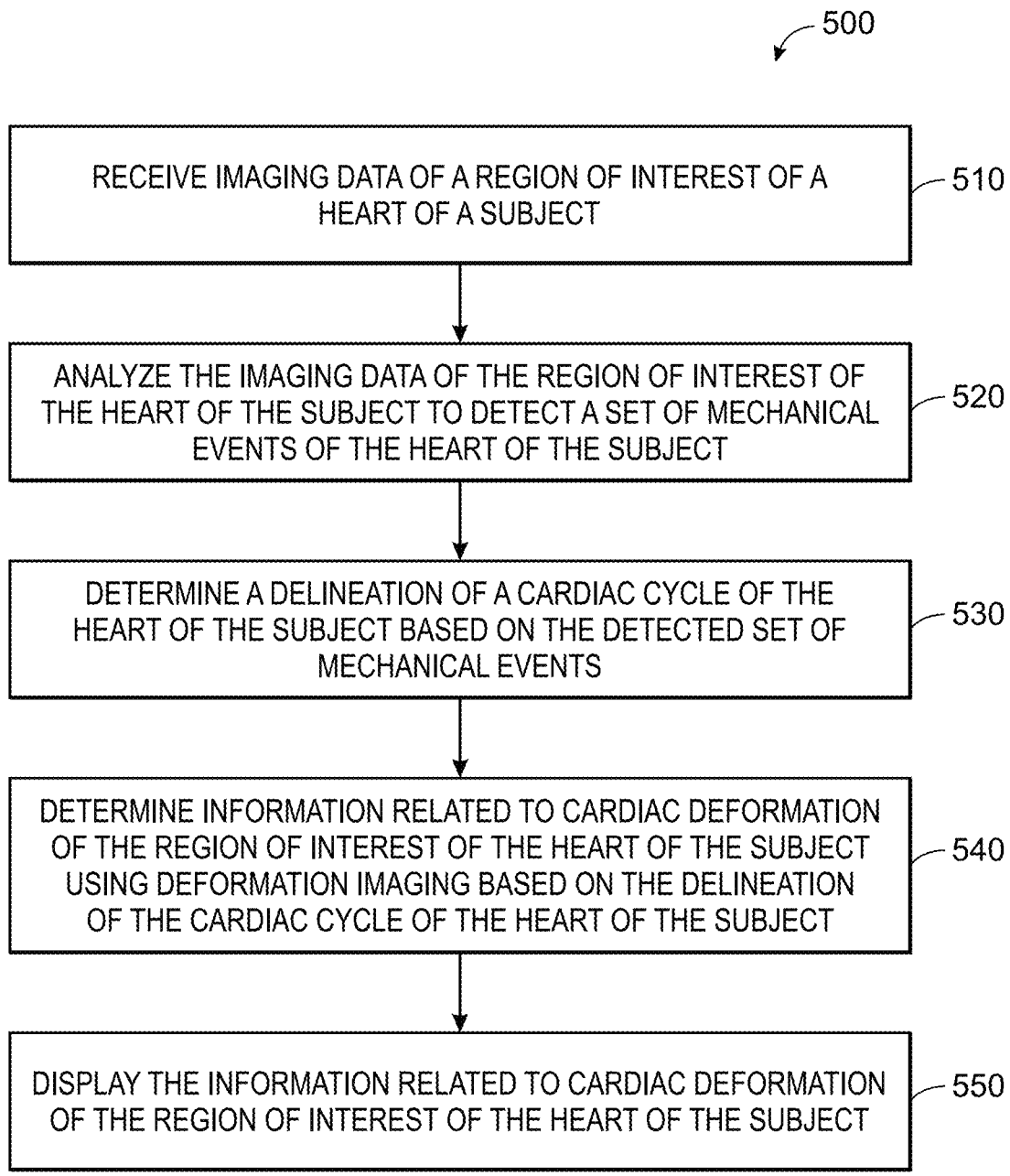
FIG. 5 is a flowchart of an example process for determining information related to cardiac deformation of a region of interest of a heart of a subject using deformation imaging and a delineation of a cardiac cycle of the heart that is determined using imaging data of the region of interest of the heart.

FIG. 5 is a flowchart of an example process for determining information related to cardiac deformation of a region of interest of a heart of a subject using deformation imaging and a delineation of a cardiac cycle of the heart that is determined using imaging data of the region of interest of the heart.

As shown in FIG. 5, the process 500 may include receiving imaging data of a region of interest of a heart of a subject (operation 510). For example, the deformation imaging system 110 may receive imaging data of a region of interest of a heart of a subject.

According to an embodiment, the deformation imaging system 110 may receive the imaging data of a region of interest of a heart of a subject from the ultrasound system 120, the preoperative imaging system 130, a database, or the like. The imaging data may be any type of medical imaging data, such as ultrasound data, CT data, MRI data, X-ray data, PET data, or the like. The deformation imaging system 110 may receive the imaging data based on requesting the imaging data, based on acquiring the imaging data, based on the occurrence of an event, based on a predetermined time frame, or the like.

According to an embodiment, the region of interest may include one or more anatomical features of the heart, such as the left atrium, the left ventricle, the right atrium, the right ventricle, the mitral valve, the aortic valve, the pulmonary valve, the tricuspid valve, or the like. The subject may be a patient, an animal, a phantom, or the like.

According to an embodiment, the deformation imaging system 110 may receive imaging data of the region of interest of the heart of the subject and ECG data of the region of interest of the heart of the subject. The imaging data and the ECG data may be temporally correlated. Alternatively, the deformation imaging system 110 may receive imaging data of the region of interest of the heart of the subject the imaging data, and might not receive ECG data of the subject such as in situations where the ECG data is unavailable.

As further shown in FIG. 5, the process 500 may include analyzing the imaging data of the region of interest of the heart of the subject to detect a set of mechanical events of the heart of the subject (operation 520). For example, the deformation imaging system 110 may analyze the imaging data of the region of interest of the subject to detect a set of mechanical events of the heart of the subject.

According to an embodiment, the deformation imaging system 110 may analyze the imaging data to detect the set of mechanical events. For example, the deformation imaging system 110 may analyze the imaging data using a template matching technique, an image registration technique, an AI technique, or the like, to the detect the set of mechanical events.

According to an embodiment, the set of mechanical events may be associated with end-diastole. For example, the set of mechanical events may include the closure of the mitral valve, the closure of the tricuspid valve, or the like. Additionally, or alternatively, the set of mechanical events may be associated with end-systole. For example, the set of mechanical events may include the closure of the aortic valve, the closure of the pulmonary valve, or the like. Alternatively, the set of mechanical events may include the opening of the mitral valve, the aortic valve, the tricuspid valve, or the pulmonary valve.

According to an embodiment, the set of mechanical events may include blood flow through the mitral valve, the aortic valve, the tricuspid valve, or the pulmonary valve, an increase in blood flow through the mitral valve, the aortic valve, the tricuspid valve, or the pulmonary valve, a decrease in blood flow through the mitral valve, the aortic valve, the tricuspid valve, or the pulmonary valve, or the like. Alternatively, the set of mechanical events may include blood flow through the left atrium, the left ventricle, the right atrium, or the right ventricle, an increase in blood flow through the left atrium, the left ventricle, the right atrium, or the right ventricle, a decrease in blood flow through the mitral valve, the aortic valve, the tricuspid valve, or the pulmonary valve, or the like.

According to an embodiment, the set of mechanical events may include a peak relaxation state or a peak contraction state of the left atrium, the left ventricle, the right atrium, or the right ventricle.

According to an embodiment, and as a particular example, the deformation imaging system 110 may analyze anatomical M-mode ultrasound data of the region of interest of the heart of the subject to detect the closure of the mitral valve. In this case, the deformation imaging system 110 may receive anatomical M-mode ultrasound data that corresponds to one or more lines that pass through the mitral valve of the heart of the subject and one or more points between a left basal point and a right basal point of the left ventricle of the heart of the subject. For example, the deformation imaging system 110 may detect the closure of the mitral valve based on detecting a particular value in the anatomical M-mode data, detecting a pattern in the anatomical M-mode data, or the like. The deformation imaging system 110 may detect the closure, or the opening, of another valve in a similar manner as described above.

According to an embodiment, and as another example, the deformation imaging system 110 may analyze color flow imaging ultrasound data of the region of interest of the heart of the subject to detect the closure of the mitral valve. For example, the deformation imaging system 110 may detect blood flow through the mitral valve, detect a reduction in blood flow through the mitral valve, detect the absence of blood through the mitral valve, or the like. The deformation imaging system 110 may detect the closure, or the opening, of another valve in a similar manner as described above.

According to an embodiment, and as another example, the deformation imaging system 110 may analyze B-mode ultrasound data of the region of interest of the heart of the subject to detect the closure of the mitral valve. For example, the deformation imaging system 110 may input the B-mode ultrasound data into an AI model, and receive an output of the AI model that identifies the closure of the mitral valve. In this case, the AI model may be trained using training data that includes B-mode ultrasound data and an indication of a closure of the mitral valve. The AI model may be trained to detect the closure of the mitral valve. The deformation imaging system 110 may detect the closure, or the opening, of another valve in a similar manner as described above.

According to an embodiment, and as another example, the deformation imaging system 110 may analyze ultrasound data of the region of interest of the heart of the subject to detect a peak relaxation state or a peak contraction state of the left atrium, the left ventricle, the right atrium, or the right ventricle.

Alternatively, the deformation imaging system 110 may use any other type of medical imaging data and/or any other type of technique to detect the set of mechanical events. Further, as an alternative, the deformation imaging system 110 may detect two separate mechanical events. For example, the deformation imaging system 110 may detect the closure of the mitral valve and the closure of the tricuspid valve, or may detect the closure of the aortic valve and the closure of the pulmonary valve. The deformation imaging system 110 may correlate the multiple detected events. In this way, the deformation imaging system 110 may more accurately detect a reference point in time, such as end-diastole, by detecting multiple mechanical events that are indicative of the occurrence of the reference point in time.

As further shown in FIG. 5, the process 500 may include determining a delineation of a cardiac cycle of the heart of the subject based on the detected set of mechanical events (operation 530). For example, the deformation imaging system 110 may determine a delineation of the cardiac cycle of the heart of the subject based on the detected set of mechanical events.

According to an embodiment, the delineation of the cardiac cycle of the heart of the subject may include a first reference point in time and a second reference point in time. In this way, the first reference point in time and the second reference point in time may delineate the cardiac cycle. The first reference point may correspond to a first detected mechanical event (e.g., mitral valve closure), and the second reference point may correspond to a second detected mechanical event (e.g., the subsequent mitral valve closure). Alternatively, the first reference point may be offset from the first detected event by a time offset, and the second reference point may be offset from the second detected event by a time offset.

According to an embodiment, the deformation imaging system 110 may determine a frame of the imaging data that corresponds to the first reference point in time, and determine a second frame of the imaging data that corresponds to the second reference point in time. Further, the deformation imaging system 110 may determine intermediate frames between the first frame and the second frame, and use the first frame, the intermediate frames, and the second frame for determining information related to cardiac deformation of the region of interest of the heart for the delineated cardiac cycle of the subject using deformation imaging, as described below. According to an embodiment, the deformation imaging system 110 may determine multiple delineations of multiple cardiac cycles of the heart of the subject using the techniques described above, and use corresponding imaging data from the respective delineated cardiac cycles.

As further shown in FIG. 5, the process 500 may include determining information related to cardiac deformation of the region of interest of the heart of the subject using deformation imaging based on the delineation of the cardiac cycle of the heart of the subject (operation 540). For example, the deformation imaging system 110 may determine information related to cardiac deformation of the region of interest of the heart of the subject using deformation imaging and the imaging data that corresponds to the delineation of the cardiac cycle of the heart of the subject.

The deformation imaging system 110 may be configured to perform deformation imaging using a deformation imaging technique, such as a template matching technique (e.g., speckle tracking), an image registration technique, an image segmentation technique, an AI technique, or the like. The deformation imaging system 110 may be configured to perform deformation imaging using imaging data from the ultrasound system 120, the preoperative imaging system 130, or the like. The imaging data may be ultrasound data, CT data, MRI data, X-ray data, PET data, or the like. The deformation imaging system 110 may use imaging data that corresponds to a delineated cardiac cycle of the subject, as described above.

To perform deformation imaging, and according to an embodiment, the deformation imaging system 110 may segment the region of interest of the heart into a set of myocardial segments, and track the respective segments over time during the delineated cardiac cycle using deformation imaging. Further, the deformation imaging system 110 may determine respective strain values of the set of myocardial segments over time based on tracking the respective segments using deformation imaging. For example, the deformation imaging system 110 may determine a strain value based on a starting length of a segment and a final length of the segment. As an example, if the starting length of the segment is "10" and the final length of the segment is "8," then the deformation imaging system 110 may determine a strain value of "−20%." As another example, if the starting length of the segment is "8" and the final length of the segment is "10," then the deformation imaging system 110 may determine a strain value of "20%." The deformation imaging system 110 may generate respective strain curves for the set of myocardial segments.

According to an embodiment, the information related to cardiac deformation of the region of interest of the heart of the subject may be strain values of myocardial segments of the heart, amounts of time to reach maximum strain values of the respective myocardial segments, particular myocardial segments that are associated with amounts of time that are greater than or less than respective thresholds, a mechanical dispersion value, a cardiac mechanical dyssynchrony parameter, or the like. Additionally, or alternatively, the information related to cardiac deformation of the region of interest heart of the subject may include an end-systolic strain that corresponds to a strain value at end-systole, peak systolic strain that corresponds to a peak strain value during systole, positive peak systolic strain that corresponds to a local myocardial stretching, a peak strain that corresponds to a peak strain value during the entire cardiac cycle, or the like. Additionally, or alternatively, the information related to cardiac deformation of the region of interest of the heart of the subject may be a velocity, a displacement, a strain rate, or the like, of a myocardial segment.

According to an embodiment, the deformation imaging system 110 may determine information related to cardiac deformation of the region of interest of the heart of the subject for a single delineated cardiac cycle. For example, the deformation imaging system 110 may receive imaging data, delineate the cardiac cycle, and determine the information related to cardiac deformation for the delineated cardiac cycle by using particular imaging data that corresponds to the delineated cardiac cycle. Alternatively, the deformation imaging system 110 may determine multiple delineations of multiple cardiac cycles of the heart of the subject using the techniques described above, and use corresponding imaging data from the respective delineated cardiac cycles to determine respective information related to cardiac deformation for the multiple delineated cardiac cycles.

As further shown in FIG. 5, the process 500 may include displaying the information related to cardiac deformation of the region of interest of the heart of the subject (operation 550). For example, the deformation imaging system 110 may display the information related to cardiac deformation of the anatomical feature of the heart, such as the mechanical dispersion value, strain values of the set of segments, amounts of time to reach maximum strain values of the respective segments, particular segments that are associated with amounts of time that are greater than or less than respective thresholds, or the like.

According to an embodiment, the deformation imaging system 110 may display the delineation of the cardiac cycle that was determined using imaging data in reference to an ECG of the subject. For example, the deformation imaging system 110 may display a first visual indicator for the first reference point in time on the ECG, and a second visual indicator for the second reference point in time on the ECG. In this way, an operator may assess the accuracy of the delineated cardiac cycle.

According to an embodiment, the deformation imaging system 110 may display a delineation of the cardiac cycle that was determined using ECG data in reference to the ECG of the subject, and display the delineation of the cardiac cycle that was determined using imaging data in reference to the ECG of the subject. For example, the deformation imaging system 110 may determine a first delineation of the cardiac cycle using ECG data by detecting a set of trigger points on the ECG, and display a first visual indicator for a first reference point in time on the ECG and a second visual indicator for the second reference point in time on the ECG. Further, the deformation imaging system 110 may determine a second delineation of the cardiac cycle using imaging data, and display a third visual indicator for a third reference point in time on the ECG and a fourth visual indicator for a fourth reference point in time on the ECG. In this way, an operator may assess whether the first delineation and the second delineation are similar, and/or may assess whether the first delineation is inaccurate.

According to an embodiment, the deformation imaging system 110 may determine whether a difference between the first delineation of the cardiac cycle determined using ECG data, and the second delineation of the cardiac cycle determined using imaging data satisfies a threshold. Further, the deformation imaging system 110 may display information identifying whether the difference between the first delineation of the cardiac cycle of the heart of the subject and the second delineation of the cardiac cycle of the heart of the subject satisfies the threshold. According to an embodiment, the deformation imaging system 110 may display information identifying that information related to cardiac deformation of the region of interest of the heart of the subject that was determined using a delineation of the cardiac cycle determined using ECG data is sub-optimal. Additionally, the deformation imaging system 110 may provide an option to override the results of the deformation measurement.

According to an embodiment, the deformation imaging system 110 may define an extended cardiac cycle that includes the first delineated cardiac cycle determined using ECG data and the second delineated cardiac cycle determined using imaging data. The extended cardiac cycle may be an extension of the first delineated cardiac cycle and/or the second delineated cardiac cycle with a predetermined length. For example, the extended cardiac cycle may include the first delineated cardiac cycle and/or the second delineated cardiac cycle with one half, one third, one quarter, etc., of the cardiac length on both ends of the first delineated cardiac cycle and/or the second delineated cardiac cycle. Further, the deformation imaging system 110 may display visual indicators that delineate the extended cardiac cycle. The deformation imaging system 110 may permit the operator to adjust any of the displayed visual indicators to updated the delineated cardiac cycle. Based on an adjustment to the displayed visual indicators, the deformation imaging system 110 may determine updated information related to cardiac deformation of the region of interest of the heart of the subject using data that corresponds to the updated delineated cardiac cycle.

Figure 6:
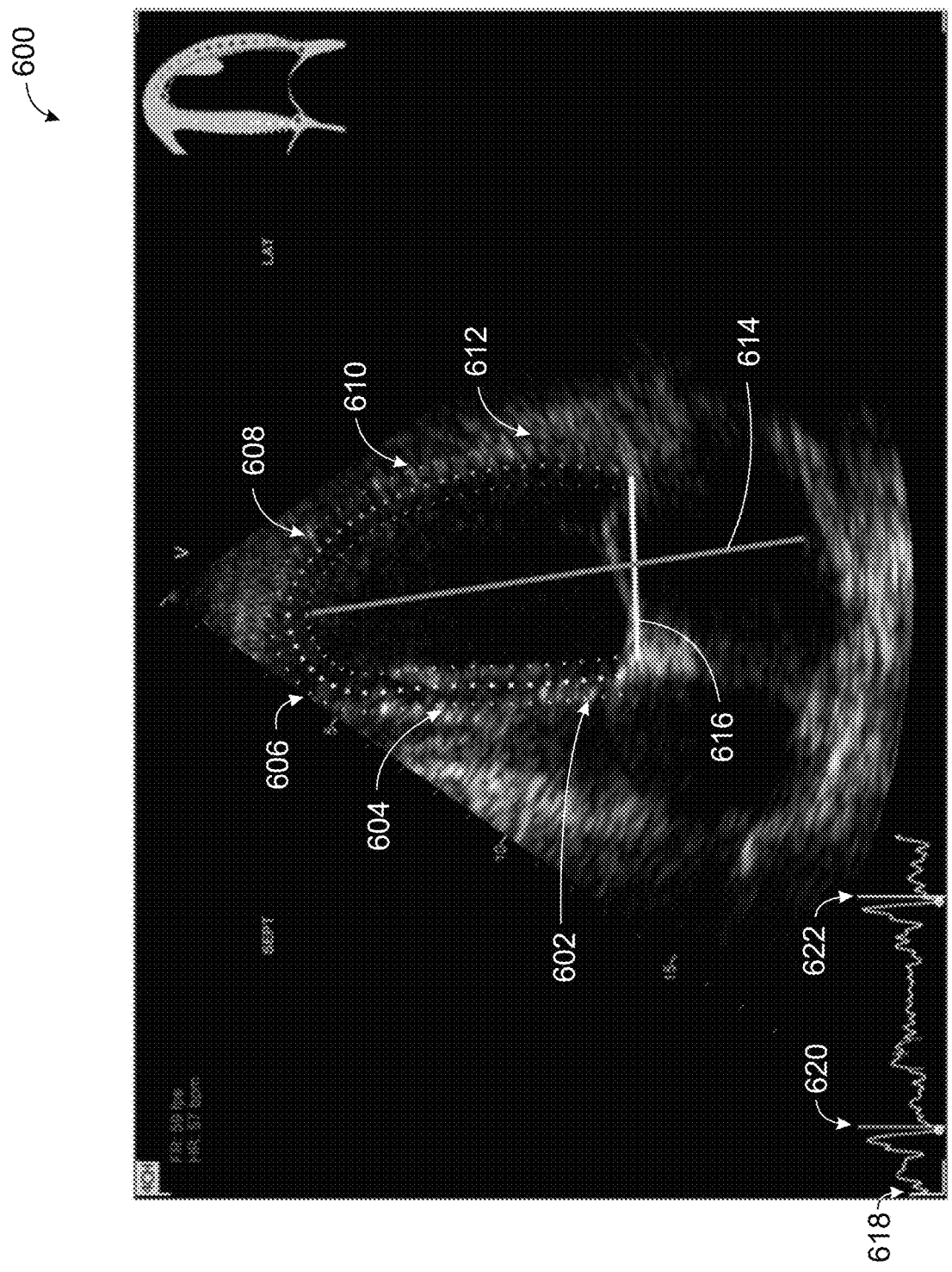
FIG. 6 is a diagram of an example user interface displaying a line corresponding to anatomical M-mode data for detecting a closure of the mitral valve of a subject, and a delineation of the cardiac cycle of the subject determined based on detecting the closure of the mitral valve of the subject using the anatomical M-mode data.

FIG. 6 is a diagram of an example user interface 600 displaying B-mode data including a line corresponding to anatomical M-mode data for detecting a closure of the mitral valve of a subject, and a delineation of the cardiac cycle of the subject determined based on detecting the closure of the mitral valve of the subject using the anatomical M-mode data. As shown in FIG. 6, the deformation imaging system 110 may display the user interface 600 that includes B-mode data of a heart of the subject. The deformation imaging system 110 may segment the left ventricle into a set of segments, such as a first segment 602, a second segment 604, a third segment 606, a fourth segment 608, a fifth segment 610, and a sixth segment 612. Further, the deformation imaging system 110 may receive anatomical M-mode data corresponding to a line 614 that passes through a mitral valve of the heart of the subject, as delineated by line 616, and a point between a left basal point and a right basal point of the left ventricle of the heart of the subject, such as between the third segment 606 and the fourth segment 608. Although a single line 614 is shown in FIG. 6, it should be understood that the deformation imaging system 110 may utilize multiple lines that correspond to a stack of anatomical M-mode data. As further shown in FIG. 6, the deformation imaging system 110 may display a delineation of the cardiac cycle of the heart of the subject in reference to an ECG 618 of the subject. The delineation may include a first visual indicator 620 corresponding to a first reference point in time, and a second visual indicator 622 corresponding to a second reference point in time. The deformation imaging system 110 may determine the first reference point in time based on detecting a closure of the mitral valve using the anatomical M-mode data corresponding to the line 614. Although FIG. 6 describes detecting the closure of the mitral valve, it should be understood that the deformation imaging system 110 may utilize a similar technique in association with the tricuspid valve. For instance, the deformation imaging system 110 may utilize one or more lines of anatomical M-mode data that pass through the tricuspid valve between an apex of the right ventricle and a mid basal point of the right ventricle.

Figure 7:
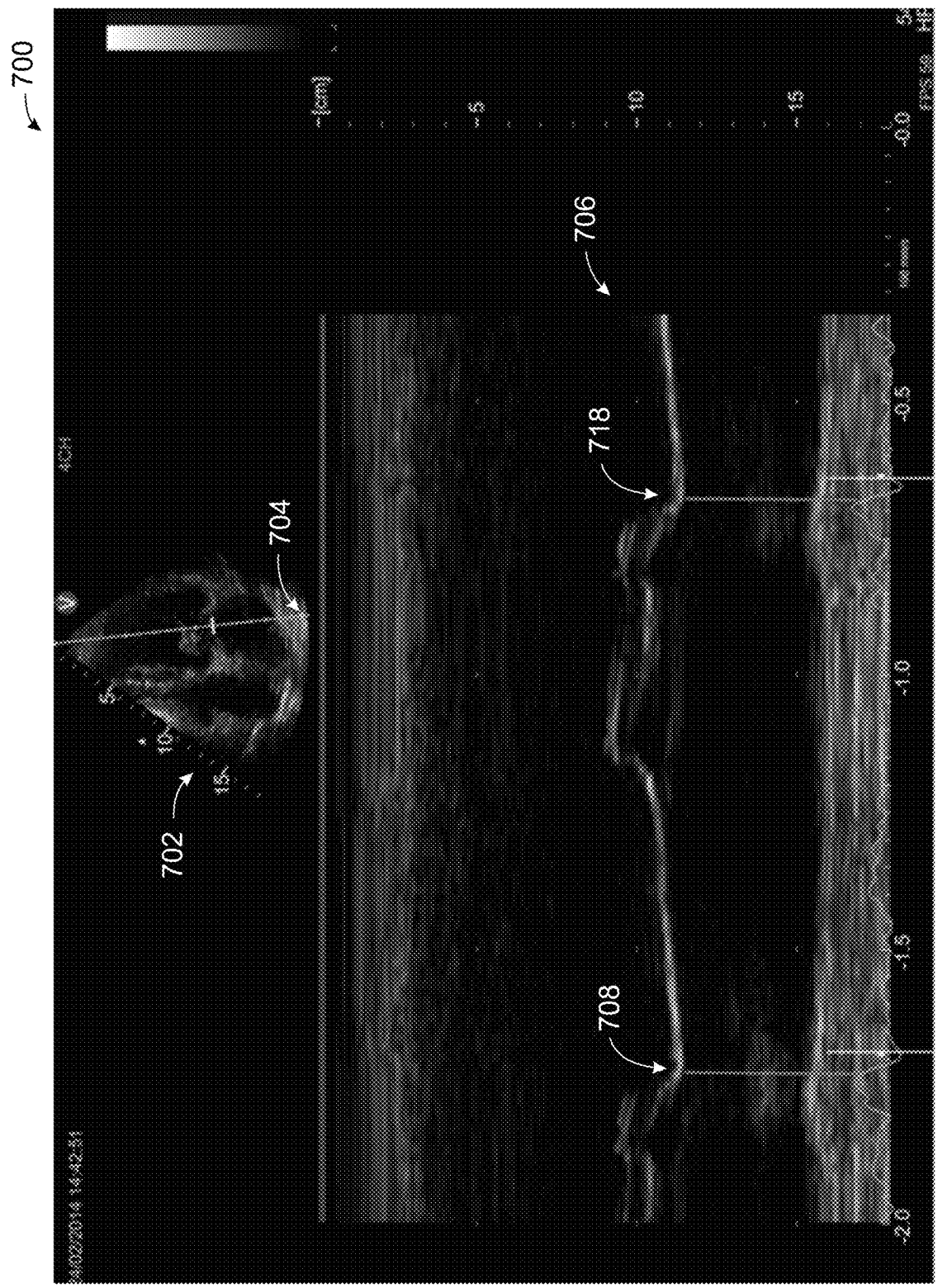
FIG. 7 is a diagram of an example user interface displaying B-mode data including a line corresponding to anatomical M-mode data for detecting a closure of the mitral valve of a subject, and the anatomical M-mode data corresponding to the line.

FIG. 7 is a diagram of an example user interface 700 displaying B-mode data including a line corresponding to anatomical M-mode data for detecting a closure of the mitral valve of a subject, and the anatomical M-mode data corresponding to the line. As shown in FIG. 7, the deformation imaging system 110 may display B-mode data 702 including a line 704 that passes through a mitral valve of the heart of the subject and a point between a left basal point and a right basal point of the left ventricle of the heart of the subject. Although a single line 704 is shown in FIG. 7, it should be understood that the deformation imaging system 110 may utilize multiple lines that correspond to a stack of anatomical M-mode data. Further, as shown, the deformation imaging system 110 may display anatomical M-mode data 706 corresponding the line 704. As shown, the deformation imaging system 110 may detect a closure of the mitral valve at a first reference point 708, and detect a subsequent closure of the mitral valve at a second reference point 710. For example, the deformation imaging system 110 may determine a feature in the M-mode data that is indicative of an atrioventricular valve closure. The deformation imaging system 110 may be configured to determine the feature using a template matching technique, an image registration technique, an AI technique, or the like. The deformation imaging system 110 may determine the delineation of the cardiac cycle of the heart of the subject based on the first reference point 708 and the second reference point 710.

Figure 8:
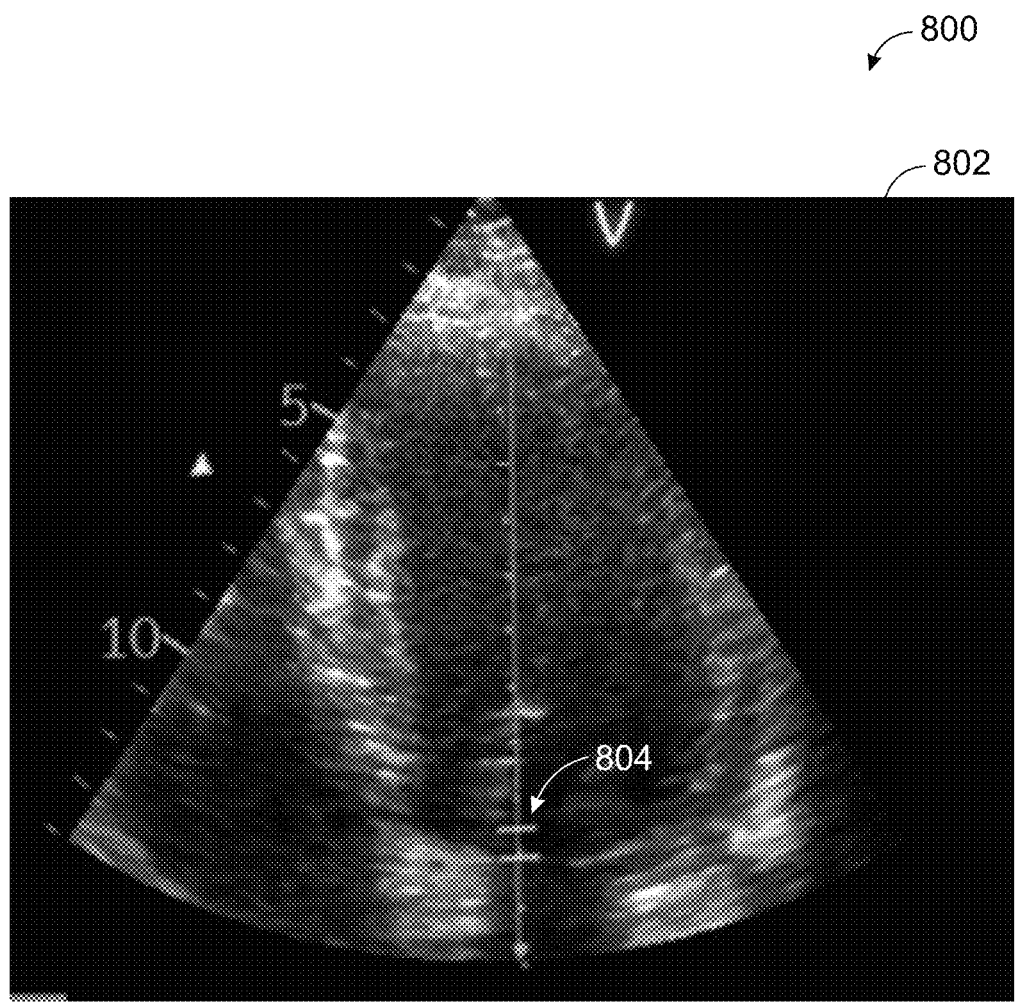
FIG. 8 is a diagram of an example user interface displaying a line corresponding to anatomical M-mode data for detecting a closure of the mitral valve of a subject.

FIG. 8 is a diagram of an example user interface 800 displaying a line corresponding to anatomical M-mode data for detecting a closure of the mitral valve of a subject. As shown in FIG. 8 the deformation imaging system 110 may display B-mode data 802 including a line 804 that passes through a mitral valve of the heart of the subject and a point between a left basal point and a right basal point of the left ventricle of the heart of the subject. Although a single line 804 is shown in FIG. 8, it should be understood that the deformation imaging system 110 may utilize multiple lines that correspond to a stack of anatomical M-mode data, which enhances the robustness and accuracy of the event time estimation.

Figure 9:
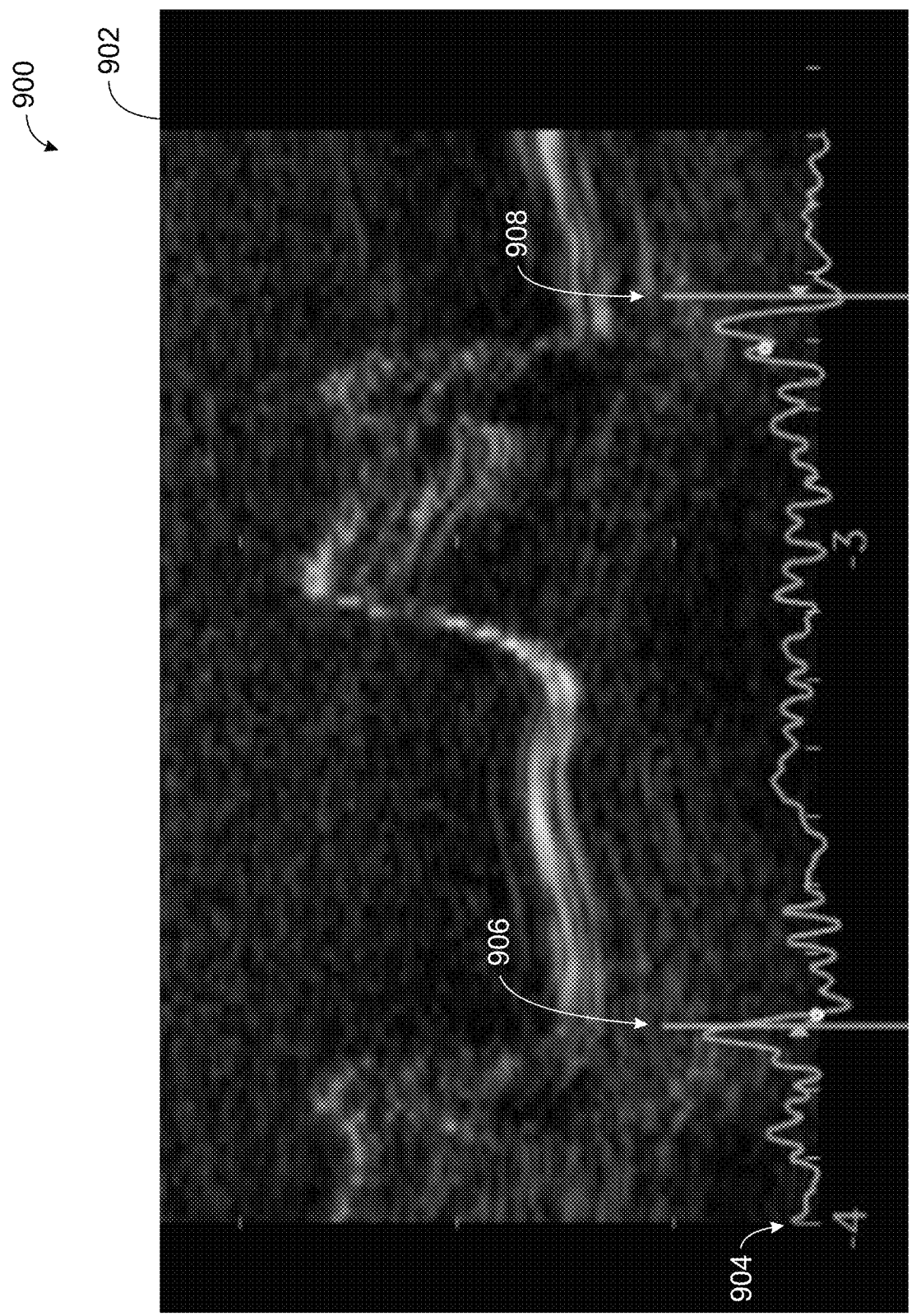
FIG. 9 is a diagram of an example user interface displaying anatomical M-mode data for detecting a closure of the mitral valve of a subject.

FIG. 9 is a diagram of an example user interface 900 displaying anatomical M-mode data for detecting a closure of the mitral valve of a subject. As shown in FIG. 9, the deformation imaging system 110 may display anatomical M-mode data 906 corresponding the line 804 shown in FIG. 8. Further, as shown, the deformation imaging system 110 may display an ECG 904 of the heart of the subject. Further, as shown, the deformation imaging system 110 may display a first visual indication 906 on the ECG 904 corresponding to a first reference point in time that was determined based on detecting a closure of the mitral valve using the anatomical M-mode data 906, and display a second visual indication 908 on the ECG 904 corresponding to a second reference point in time that was determined based on detecting a subsequent closure of the mitral valve using the anatomical M-mode data 906. The deformation imaging system 110 may determine a delineation of the cardiac cycle of the heart of the subject based on the first reference point in time and the second reference point in time.

Figure 10:
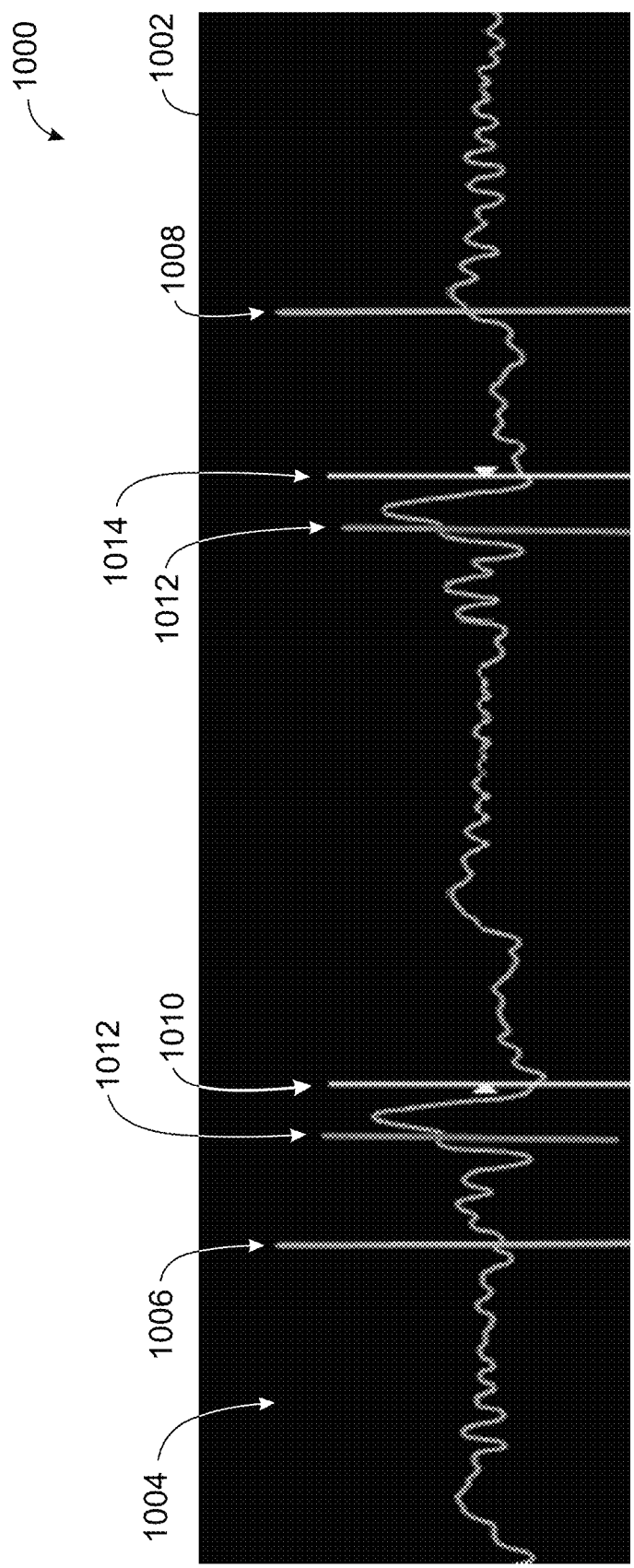
FIG. 10 is a diagram of an example user interface displaying an extended cardiac cycle in reference to an ECG, a first delineated cardiac cycle determined using ECG data, and a second delineated cardiac cycle determined using imaging data.

FIG. 10 is a diagram of an example user interface 1000 displaying an extended cardiac cycle in reference to an ECG, a first delineated cardiac cycle determined using ECG data, and a second delineated cardiac cycle determined using imaging data. As shown in FIG. 10, the deformation imaging system 110 may display an ECG 1004 of a subject, and display an extended cardiac cycle that includes a first delineated cardiac cycle determined using ECG data and a second delineated cardiac cycle determined using imaging data. The deformation imaging system 110 may display a first visual indicator 1006 and a second visual indicator 1008 that delineate the extended cardiac cycle. Further, the deformation imaging system 110 may display a third visual indicator 1010 and a fourth visual indicator 1012 that delineate a first delineated cardiac cycle determined using ECG data. Further still, the deformation imaging system 110 may display a fifth visual indicator 1012 and a sixth visual indicator 1014 that delineate a second delineated cardiac cycle determined using imaging data. As addressed above, the deformation imaging system 110 may permit the operator to adjust any of the displayed visual indicators to updated the delineated cardiac cycles. Based on an adjustment to the displayed visual indicators, the deformation imaging system 110 may determine updated information related to cardiac deformation of the region of interest of the heart of the subject using data that corresponds to the updated delineated cardiac cycles. Although FIG. 10 depicts the user interface 1000 as displaying the first visual indicator 1006 and the second visual indicator 1008 that delineate the extended cardiac cycle, it should be understood that the user interface 1000 might not display the first visual indicator 1006 and the second visual indicator 1008 in some embodiments. In these cases, the deformation imaging system 110 may internally utilize the extended cardiac cycle, but might not otherwise display a visualization of the extended cardiac cycle to the user.

Although the present disclosure describes the delineation of a single cardiac cycle, it should be understood that the deformation imaging system 110 may determine multiple delineations of multiple cardiac cycles of the heart of the subject and determine information related to cardiac deformation using respective imaging data corresponding to the delineated multiple cardiac cycles. Although the disclosure describes the adjustment of cardiac cycles for strain calculations in reference to the left ventricle, it should be understood that the embodiments herein are applicable to the adjustment of cardiac cycles for strain calculations in other chambers. For instance, anatomical M-mode data of the right ventricle may be obtained, and similar techniques may be applied with respect to the tricuspid valve to adjust the cycle. Further, for the right ventricle chamber, the anatomical M-mode may pass through the apex and the tricuspid valve plane.

Although though the present disclosure addresses the problem specifically for the left ventricle chamber and left bundle branch block pathology, the techniques herein can be applied to the right ventricle chamber and right bundle branch block as well. In this way, the embodiments herein are generalized to cycle delineation for strain calculation on patients with conduction abnormalities, as this can cause ECG surrogates to be inaccurate for cardiac event timing estimation.

To enhance the timing estimation, rather than using a single line to define the anatomical M-mode, the techniques herein may generate a stack of anatomical M-mode data. This can be achieved by incorporating multiple lines that pass through the apex and the planes of the atrioventricular valves.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A system comprising:
   a memory configured to store instructions; and
   one or more processors configured to execute the instructions to:
   receive imaging data of a region of interest of a heart of a subject;
   analyze the imaging data of the region of interest of the heart of the subject to detect a set of mechanical events of the heart of the subject;
   determine a delineation of a cardiac cycle of the heart of the subject based on the detected set of mechanical events;
   determine information related to cardiac deformation of the region of interest of the heart of the subject using deformation imaging based on the delineation of the cardiac cycle of the heart of the subject; and
   display the information related to cardiac deformation of the region of interest of the heart of the subject.

2. The system of claim 1, wherein the set of mechanical events includes a closure of an atrioventricular valve.

3. The system of claim 1, wherein the information related to cardiac deformation of the heart of the subject includes one or more of an end-systolic strain, peak systolic strain, positive peak systolic strain, or peak strain.

4. The system of claim 1, wherein the imaging data is anatomical M-mode ultrasound data.

5. The system of claim 4, wherein the anatomical M-mode ultrasound data corresponds to one or more lines that pass through an atrioventricular valve of the heart of the subject and one or more points between a left basal point and a right basal point of a ventricle of the heart of the subject.

6. The system of claim 4, wherein the one or more processors are configured to detect the set of mechanical events by determining a feature in the anatomical M-mode data that is indicative of a closure of an atrioventricular valve using a template matching technique, an image registration technique, or an artificial intelligence (AI) technique.

7. The system of claim 1, wherein the one or more processors are further configured to:
   detect a set of trigger points of an electrocardiogram (ECG) of the heart of the subject;
   determine another delineation of the cardiac cycle of the heart of the subject based on the set of trigger points;
   determine whether a difference between the delineation of the cardiac cycle of the heart of the subject and the other delineation of the cardiac cycle of the heart of the subject satisfies a threshold; and
   display information identifying whether the difference between the delineation of the cardiac cycle of the heart of the subject and the other delineation of the cardiac cycle of the heart of the subject satisfies the threshold.

8. A method comprising:
   receiving imaging data of a region of interest of a heart of a subject;
   analyzing the imaging data of the region of interest of the heart of the subject to detect a set of mechanical events of the heart of the subject;
   determining a delineation of a cardiac cycle of the heart of the subject based on the detected set of mechanical events;
   determining information related to cardiac deformation of the region of interest of the heart of the subject using deformation imaging based on the delineation of the cardiac cycle of the heart of the subject; and
   displaying the information related to cardiac deformation of the region of interest of the heart of the subject.

9. The method of claim 8, wherein the set of mechanical events includes a closure of an atrioventricular valve.

10. The method of claim 8, wherein the information related to cardiac deformation of the heart of the subject includes one or more of an end-systolic strain, peak systolic strain, positive peak systolic strain, or peak strain.

11. The method of claim 8, wherein the imaging data is anatomical M-mode ultrasound data.

12. The method of claim 11, wherein the anatomical M-mode ultrasound data corresponds to one or more lines that pass through an atrioventricular valve of the heart of the subject and one or more points between a left basal point and a right basal point of a ventricle of the heart of the subject.

13. The method of claim 11, wherein the detecting the set of mechanical events comprises detecting the set of mechanical events by determining a feature in the anatomical M-mode data that is indicative of a closure of an atrioventricular valve using a template matching technique, an image registration technique, or an artificial intelligence (AI) technique.

14. The method of claim 8, further comprising:
   detecting a set of trigger points of an electrocardiogram (ECG) of the heart of the subject;
   determining another delineation of the cardiac cycle of the heart of the subject based on the set of trigger points;

determining whether a difference between the delineation of the cardiac cycle of the heart of the subject and the other delineation of the cardiac cycle of the heart of the subject satisfies a threshold; and displaying information identifying whether the difference between the delineation of the cardiac cycle of the heart of the subject and the other delineation of the cardiac cycle of the heart of the subject satisfies the threshold.

15. A non-transitory computer-readable medium storing instructions that, when executed by one or more processors, cause the one or more processors to:

receive imaging data of a region of interest of a heart of a subject;

analyze the imaging data of the region of interest of the heart of the subject to detect a set of mechanical events of the heart of the subject;

determine a delineation of a cardiac cycle of the heart of the subject based on the detected set of mechanical events;

determine information related to cardiac deformation of the region of interest of the heart of the subject using deformation imaging based on the delineation of the cardiac cycle of the heart of the subject; and display the information related to cardiac deformation of the region of interest of the heart of the subject.

16. The non-transitory computer-readable medium of claim 15, wherein the set of mechanical events includes a closure of an atrioventricular valve.

17. The non-transitory computer-readable medium of claim 15, wherein the information related to cardiac deformation of the heart of the subject includes one or more of an end-systolic strain, peak systolic strain, positive peak systolic strain, or peak strain.

18. The non-transitory computer-readable medium of claim 15, wherein the imaging data is anatomical M-mode ultrasound data.

19. The non-transitory computer-readable medium of claim 18, wherein the anatomical M-mode ultrasound data corresponds to one or more lines that pass through an atrioventricular valve of the heart of the subject and one or more points between a left basal point and a right basal point of a ventricle of the heart of the subject.

20. The non-transitory computer-readable medium of claim 18, wherein the one or more processors are configured to detect the set of mechanical events by determining a feature in the anatomical M-mode data that is indicative of a closure of an atrioventricular valve using a template matching technique, an image registration technique, or an artificial intelligence (AI) technique.

* * * * *